(12) United States Patent
Sakata et al.

(10) Patent No.: US 7,466,379 B2
(45) Date of Patent: Dec. 16, 2008

(54) DISPLAY APPARATUS

(75) Inventors: Tatsuya Sakata, Tokyo (JP); Hiroyuki Ono, Tokyo (JP); Hitoshi Takahashi, Kanagawa (JP); Keiichi Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 11/348,478

(22) Filed: Feb. 7, 2006

(65) Prior Publication Data

US 2006/0209502 A1   Sep. 21, 2006

(30) Foreign Application Priority Data

Feb. 14, 2005   (JP) ............................. P2005-035998

(51) Int. Cl.
*G02F 1/1335* (2006.01)
*G06F 1/16* (2006.01)

(52) U.S. Cl. ............................ 349/106; 349/16; 349/56; 349/58; 361/681

(58) Field of Classification Search .................... 349/16, 349/56, 58, 61, 106, 107, 122, 138, 153, 349/193; 361/681
See application file for complete search history.

(56) References Cited

U.S. PATENT DOCUMENTS 4,853,296 A * 8/1989 Fukuyoshi ................... 428/623
6,590,622 B1 * 7/2003 Nakanishi et al. ............. 349/12
6,798,467 B2 * 9/2004 Tasaki et al. .................. 349/58
7,042,156 B2 * 5/2006 Sakamoto .................... 313/583
2003/0210291 A1 * 11/2003 Kasahara et al. ............... 347/9
2006/0209502 A1 * 9/2006 Sakata et al. ................ 361/681

FOREIGN PATENT DOCUMENTS

JP           05-103284         4/1993

* cited by examiner

*Primary Examiner*—Brian M Healy
(74) *Attorney, Agent, or Firm*—Finnegan, Henderson, Farabow, Garrett & Dunner, L.L.P.

(57) ABSTRACT

A display apparatus includes a thin-plate display device and a rear cover. The display device has a thickness, a display surface at one side in a thickness direction for displaying an image, and a back surface at the other side in the thickness direction. The rear cover covers the back surface of the display device, has a back wall mounted to the back surface, and a side wall raised forwardly from a periphery of the back wall and extending along the outside of the periphery of the display device. A transparent film is adhered to the entire display surface and extends beyond the periphery of the display surface from where the film is adhered to the display surface. An outer edge of the film, being an edge in the extension direction, is mounted to the side wall. Accordingly, the film forms a front surface of the display apparatus.

7 Claims, 4 Drawing Sheets

DISPLAY APPARATUS

CROSS REFERENCES TO RELATED APPLICATIONS

The present invention contains subject matter related to Japanese Patent Application JP 2005-035998 filed in the Japanese Patent Office on Feb. 14, 2005, the entire contents of which are incorporated herein by reference.

BACKGROUND OF THE INVENTION

1. Field of the Invention

The present invention relates to a display apparatus.

2. Description of the Related Art

A display apparatus which includes a thin-plate display device, such as an organic electronic luminescent (EL) display device, a plasma display device, or a liquid crystal display device, has a front cover for covering a display surface of the display device and a rear cover for covering a side opposite to the display surface (refer to Japanese Unexamined Patent Application Publication No. 5-103284).

In such a display apparatus, for example, a rectangular window (opening) is formed in the front cover, and the front side of the display surface of the display device is exposed from the inside of the window.

SUMMARY OF THE INVENTION

In such a display apparatus, since the front cover is positioned as if it is a frame in an annular area along the outer edges of the display surface of the display device, a stepped portion is formed between the front cover and the display surface, causing the front cover to occupy a space in front of the display surface, the amount of this space being in correspondence with the size of the stepped portion. This is disadvantageous in terms of reducing the space occupied by the display apparatus in a direction perpendicular to the display surface of the display device, that is, reducing the thickness of the display apparatus.

Accordingly, it is desirable to provide a display apparatus which is advantageous in reducing its thickness.

According to an embodiment of the present invention, there is provided a display apparatus including a thin-plate display device and a rear cover. The thin-plate display device has a thickness, a display surface, and a back surface. The display surface is disposed at one side of the display device in a thickness direction thereof for displaying an image, and the back surface is disposed at the other side of the display device in the thickness direction thereof. The rear cover covers the back surface of the display device, and has a back wall and a side wall. The back wall is mounted to the back surface, and the side wall is raised forwardly from a periphery of the back wall and extends along the outside of the periphery of the display device. A transparent film is adhered to the entire display surface. The film extends beyond the periphery of the display surface from a portion of the film adhered to the display surface, and an outer edge of the film, which is an edge in a direction of the extension, is mounted to the side wall, so that a front surface of the display apparatus is formed by the film.

According to the embodiment of the present invention, the front surface of the display apparatus is formed by a transparent film mounted to the entire display surface. Therefore, unlike the related display apparatus, the front cover does not exist externally of the display surface, so that the display apparatus is advantageous in reducing its thickness in a direction perpendicular to the display surface.

DESCRIPTION OF THE PREFERRED EMBODIMENTS

According to embodiments of the present invention, a front surface of a display apparatus is formed by a transparent film which is adhered to the entire display surface of a display device and whose outer edges are mounted to side walls of a rear cover.

First Embodiment

A description of a display apparatus of an embodiment of the present invention will hereunder be given with reference to the drawings.

Figure 1A:
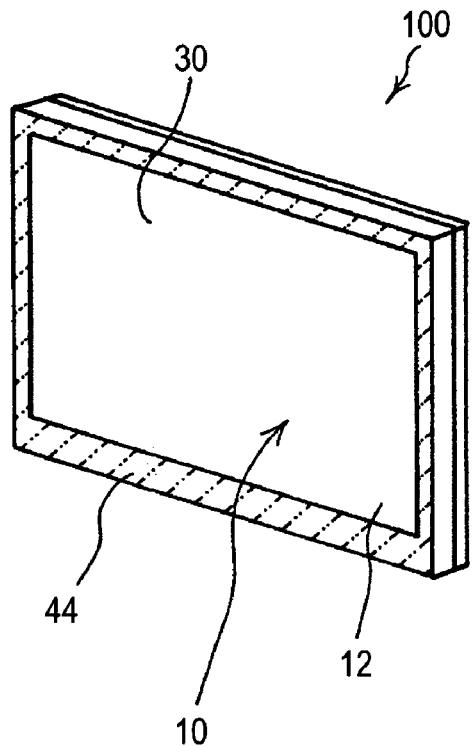
FIG. 1A is a perspective view of a display apparatus 100 according to a first embodiment.
Figure 1B:
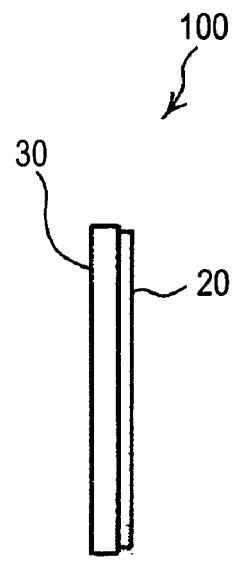
FIG. 1B is a side view of the display apparatus 100.
Figure 2:
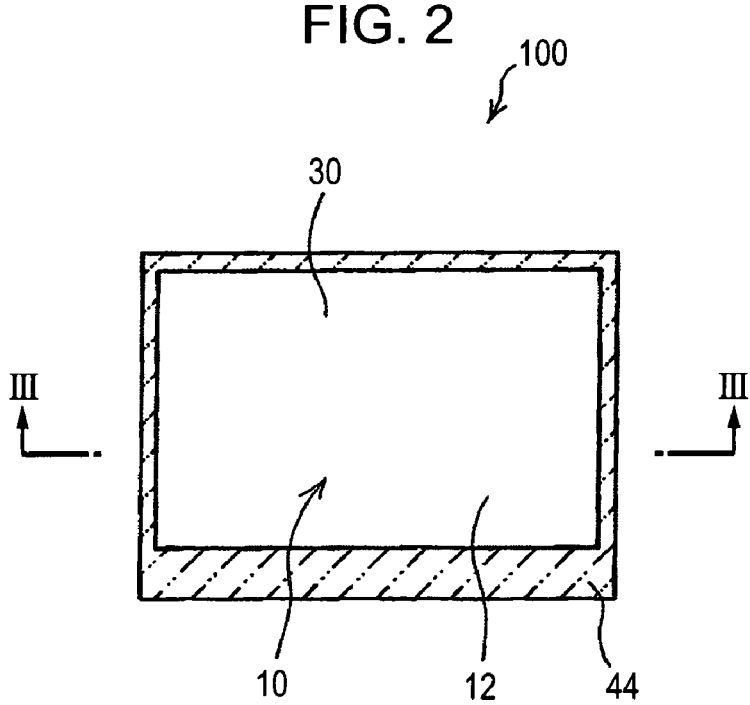
FIG. 2 is a front view of the display apparatus 100.

FIG. 1A is a perspective view of a display apparatus 100 according to a first embodiment. FIG. 1B is a side view of the display apparatus 100. FIG. 2 is a front view of the display apparatus 100.

Figure 3:
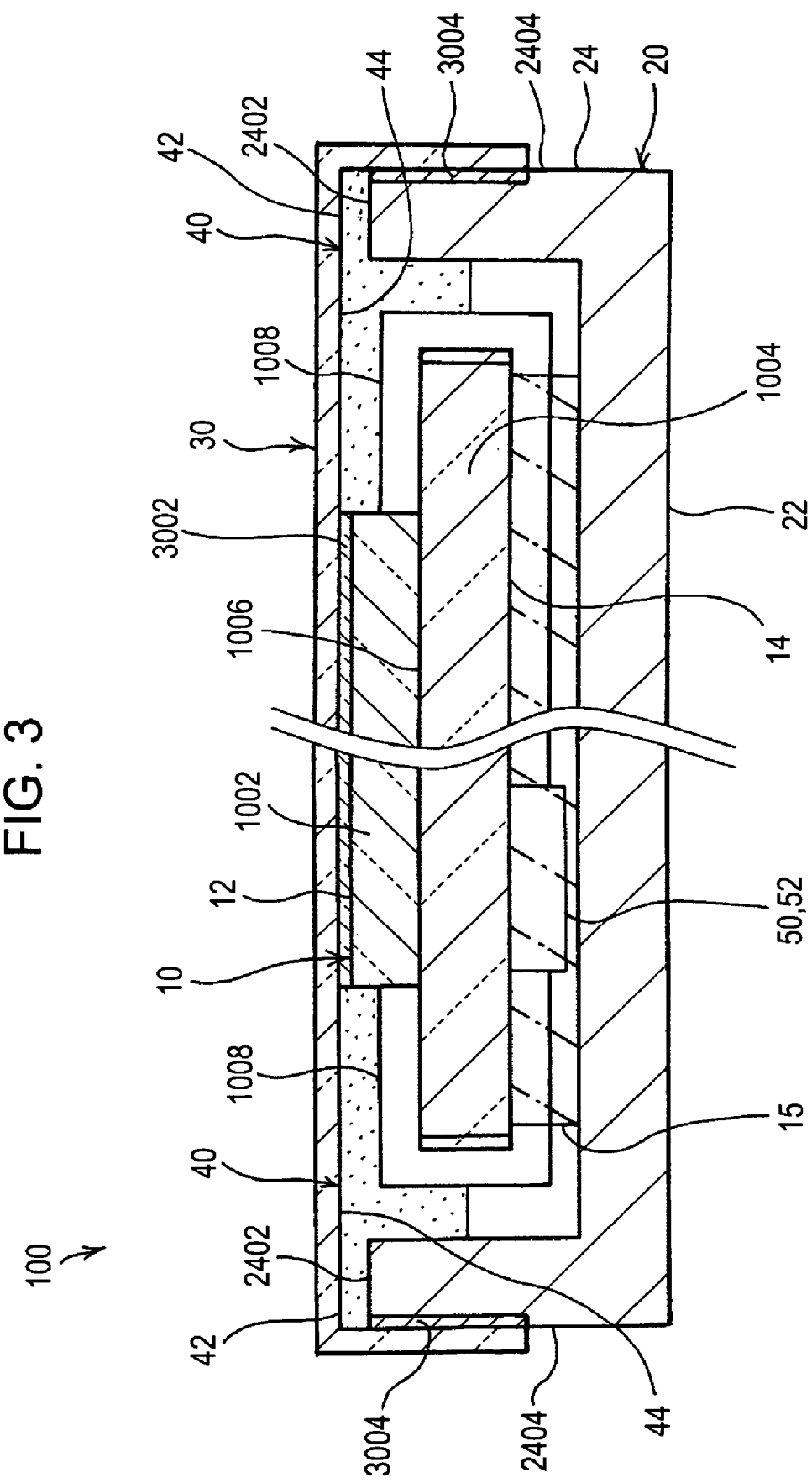
FIG. 3 is a sectional view taken along line III-III of FIG. 2.

FIG. 3 is a sectional view taken along line III-III of FIG. 2.

Figure 4:
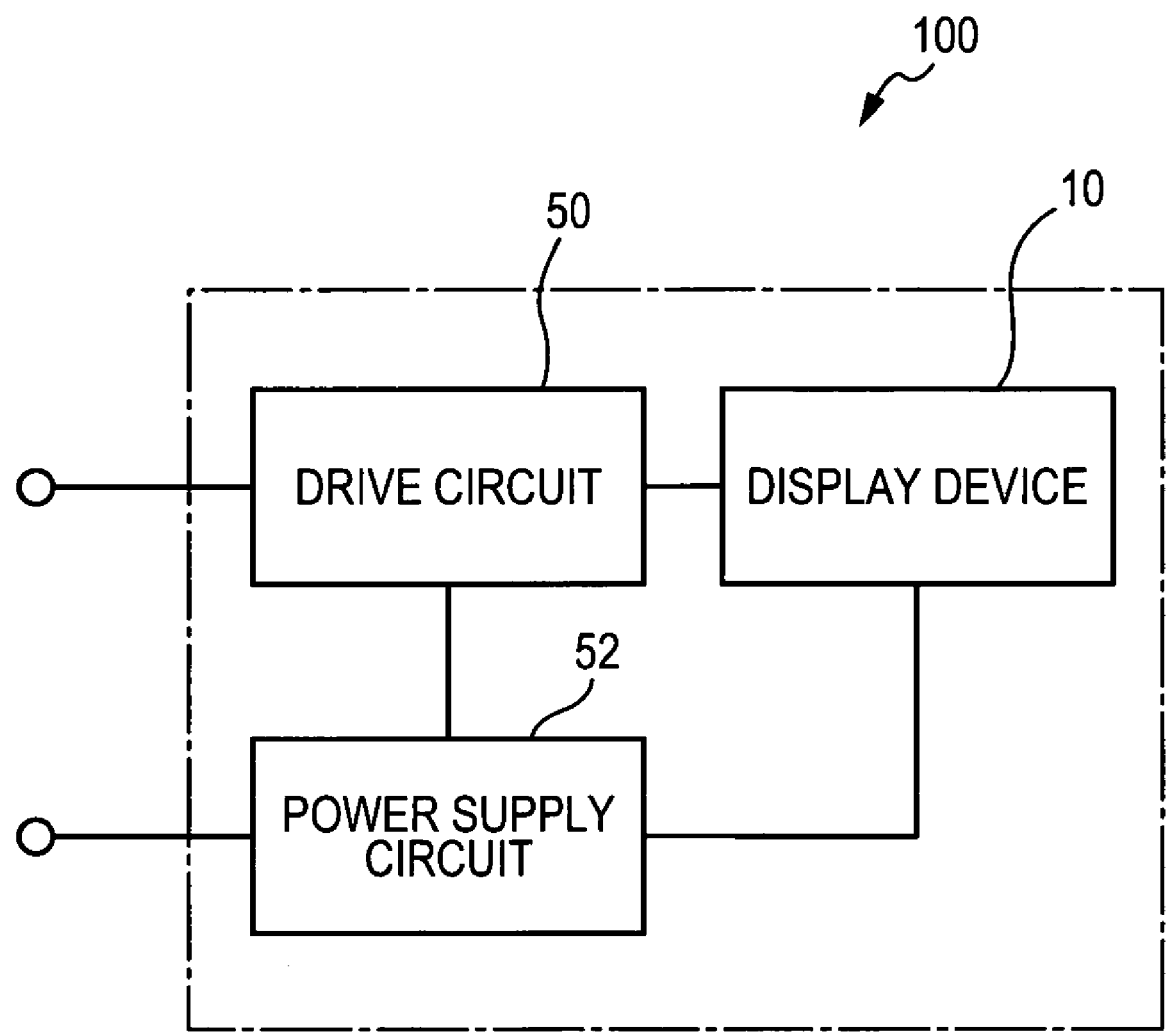
FIG. 4 is a block diagram of the structure of the display apparatus 100.

FIG. 4 is a block diagram of the structure of the display apparatus 100.

A controlling system of the display apparatus 100 will be described. As shown in FIG. 4, the display apparatus 100 includes a drive circuit 50 and a power supply circuit 52, both of which are connected to a display device 10.

The drive circuit 50 generates a drive signal on the basis of a signal which is supplied from an external device and supplies the drive signal to the display device 10. Here, the signal which is supplied from an external device is, for example, a signal indicating a moving image, a still image, a symbol, or a character, supplied from a controlling unit of a personal computer, or a signal indicating a moving image or a still image, supplied from a DVD player, a TV tuner, or a video camera. The signal may be supplied by a wired system or a wireless system.

The power supply circuit 52 generates electrical power for driving the display device 10 and electrical power for driving the drive circuit 50 on the basis of an external or an internal power supply of the display apparatus 100, and supplies the electrical power to the display device 10 and the drive circuit 50. The electrical power may be provided by a battery disposed at the display apparatus 100 or by a system which supplies electrical power from an external unit regardless of whether it is a wired or a wireless system. The invention may be applied to, for example, a case in which the display apparatus 100 is installed in various electronic apparatuses (such as a TV apparatus, a note personal computer, a PDA, or a cellular phone) in addition to being applied to the case in which a signal is supplied to the display apparatus 100 from an external device.

As shown in FIG. 3, the display apparatus 100 includes the display device 10, a rear cover 20, a film 30, and a filler 40.

The display device 10 has the form of a rectangular thin plate. It has a display surface 12 at one side in a thickness direction thereof and a back surface 14 at the other side in the thickness direction thereof.

In the embodiment, the display device 10 includes an organic electronic luminescent (EL) display, and is formed so as to display a still image, a moving image, or an image including, for example, a character or a symbol.

The organic EL display includes a first glass plate 1002 and a second glass plate 1004, which are superimposed upon each other, and a display unit 1006. The display unit 1006 is formed of, for example, a fluorescent material and electrodes, which are disposed between the first glass plate 1002 and the second glass plate 1004, and displays the image by, for example, the fluorescent material and the electrodes.

The display surface 12 corresponds to the surface of the first glass plate 1002 opposite to the surface of the first glass plate 1002 facing the display unit 1006 (that is, corresponds to the front surface of the first glass plate 1002). The back surface 14 corresponds to the surface of the second glass plate 1004 opposite to the surface of the second glass plate 1004 facing the display unit 1006 (that is, corresponds to the back surface of the second glass plate 1004).

The drive signal from the drive circuit 50 is supplied to the electrodes of the display unit 1006 through a flexible substrate 1008. Electronic parts (chip parts) included in the drive circuit 50 and the power supply circuit 52 are mounted on the flexible substrate 1008.

The rear cover 20 is used to cover the back surface 14 of the display device 10, and has a back wall 22 and side walls 24. The back wall 22 is mounted to the back surface 14. The side walls 24 are raised forwardly from the peripheral portions of the back wall 22 and surround the display device 10. The rear cover 20 is formed with a size which allows the display device 10 to be accommodated therein.

As shown by alternate long and short dash lines in FIG. 3, the back surface 14 of the display device 10 excluding where the flexible substrate 1008 and the electronic parts included in the drive circuit 50 and the power supply circuit 52 are formed is mounted to the rear cover 20 with a thermally conductive sheet 15 which is a thermally conductive double-faced tape.

The side walls 24 each have a front end surface 2402 and an outwardly facing side surface 2404.

In the embodiment, the rear cover 20 is formed of a metallic material having high thermal conductivity, such as magnesium or aluminum, and efficiently dissipates heat produced at the display device 10 through the thermally conductive sheet 15.

The film 30 is transparent, and is adhered to the entire display surface 12 with, for example, a. transparent double-faced tape 3002.

In the embodiment, the film 30 is a film subjected to anti-reflection (AR) coating for preventing reflection with respect to the display surface 12 of the display device 10. The film 30 is formed of a synthetic resin material, such as polyethylene terephthalate (PET), acryl, or polycarbonate (PC), and has a thickness of, for example, approximately 0.2 mm.

The film 30 extends beyond the periphery of the display surface 12 in a plane in which the portion of the film 30 is adhered to the display surface 12, and outer edges of the film 30 (that is, edges of the film 30 in the direction of the aforementioned extension) pass in front of the front end surfaces 2402 of the side walls 24 of the rear cover 20 and are adhered to the side surfaces 2404 with, for example, a double-faced tape 3004. Accordingly, the front surface of the display apparatus 100 is formed by the film 30.

Rectangular frame-like gaps formed between the side wall 24 and the display device 10 and between the other side wall 24 and the display device 10 behind the film 30 are filled with the filler 40. The filler 40 prevents air from entering a portion between the film 30 and the display surface 12.

The filler 40 has a front surface 42 extending in the plane of the display surface 12 between the side wall 24 and the display device 10 and between the other side wall 24 and the display device 10 behind the film 30. The film 30 makes the entire front surface of the display apparatus 100 flat.

In the embodiment, the filler 40 is formed of a synthetic resin material such as ABS or PS.

In the embodiment, as shown by alternate long and two short dash lines in FIGS. 1A and 2, an opaque coating material 44 is printed to the film 30 so as to cover the front surface 42 of the filler 40. The coating material 44 may be applied from outside an effective display area of the display surface 12, and is used to improve how the display apparatus 100 appears by hiding the spaces between the inner sides of the side walls 24 and the respective sides of the display device 10.

According to the display apparatus 100 of the embodiment, the transparent film 30 mounted to the entire display surface 12 extends beyond the periphery of the display surface 12 and the outer edges (edges of the film 30 in the direction of the aforementioned extension) are mounted to the side walls 24 of the rear cover 20, so that the front surface of the display apparatus 100 is formed by the film 30. Therefore, unlike the related display apparatus, a front cover does not exist outside the display surface 12. Consequently, the space occupied by the display apparatus 100 in front of the display surface 12 can be considerably reduced, so that the thickness of the display apparatus 100 in a direction perpendicular to the display surface 12 is reduced. Therefore, the display apparatus 100 is advantageous in reducing its thickness.

In the embodiment, the thickness of the display apparatus 100 having the 15-inch display surface 12 can be reduced to 3 to 5 mm.

Since the front surface of the display apparatus 100 is formed by the film 30, and is a unitary surface without any joints, the display apparatus 100 provides a feature differing from the related display apparatus having a frame around the display surface 12. Therefore, the display apparatus 100 can attract the attention of a purchaser and increase the purchaser's appetite for buying it.

Since the related frame is not provided outside the display surface 12, the display apparatus 100 can be made lighter.

Second Embodiment

A second embodiment will be described.

Figure 5:
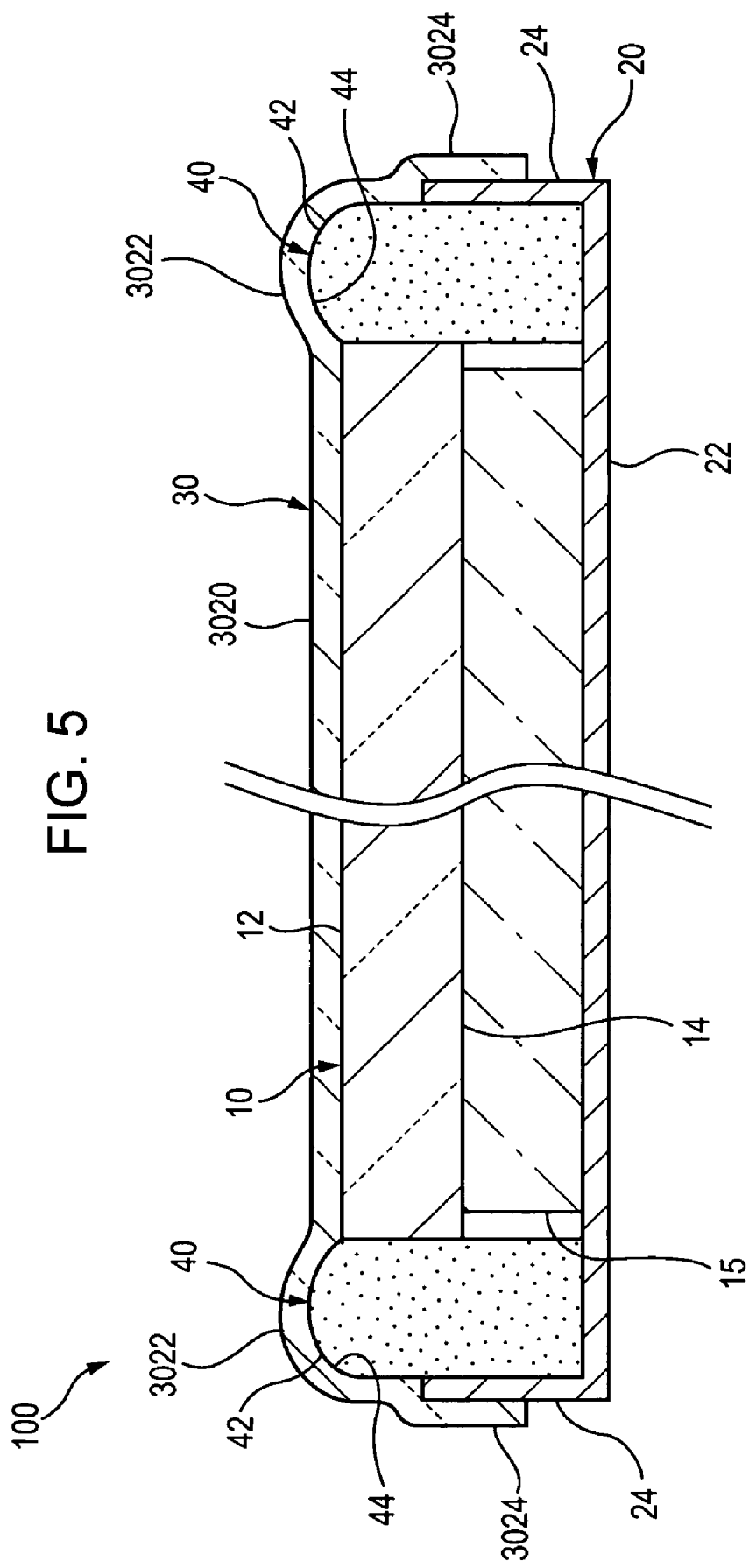
FIG. 5 is a sectional view of a display apparatus 100 according to a second embodiment.

FIG. 5 is a sectional view of a display apparatus 100 of the second embodiment.

The second embodiment differs from the first embodiment in the form of a front surface 42 of a filler 40 positioned outside a display surface 12.

More specifically, in the second embodiment, the front surface 42 of the filler 40 is an outwardly curved surface. Accordingly, a film 30 has a flat film portion 3020 adhered to the display surface 12, outer frame portions 3022 extending forwardly from the film portion 3020 and along the outside of the periphery of the display surface 12 at the curved surfaces, and outer edges 3024 mounted to side walls 24 at the ends of the respective outer frame portions 3022.

The second embodiment provides the same advantages as those of the first embodiment.

The film 30 may be mounted to the side walls 24 by various related mounting methods which are publicly known, such as joining the film 30 by thermal contraction of the film 30 or adhering the film 30 with an adhesive.

Although, in each of the embodiments, the film 30 is a film subjected to AR coating, the film 30 may be any type of film as long as it is transparent. Therefore, various other related films which are publicly known may be used as long as they are transparent.

The term "film 30" in each of the embodiments of the present invention refers to various transparent materials which are publicly known regardless of whether they are transparent and colorless, transparent and colored or whether they are a thin plate member or a sheet member.

Although in each of the embodiments the display device 10 is an organic EL display device, it is obvious that the display device 10 may be various other related thin-plate display devices that are publicly known, such as a plasma display device or a liquid crystal display device.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
   a thin-plate display device having a thickness, a display surface, and a back surface, the display surface being disposed at one side of the display device in a thickness direction thereof for displaying an image, the back surface being disposed at the other side of the display device in the thickness direction thereof; and
   a rear cover for covering the back surface of the display device, the rear cover having a back wall and a side wall, the back wall being mounted to the back surface, the side wall being raised forwardly from a periphery of the back wall and extending along the outside of the periphery of the display device,
   wherein a transparent film is adhered to the entire display surface, the film extending beyond the periphery of the display surface from a portion of the film adhered to the display surface, an outer edge of the film, which is an edge in a direction of the extension, being mounted to the side wall, so that a front surface of the display apparatus is formed by the film.

2. The display apparatus according to claim 1, wherein the side wall has a front end surface and an outwardly facing side surface, and the film extends in front of the front end surface and is mounted to the side surface.

3. The display apparatus according to claim 1, wherein a portion between the side wall and the display device is filled with a filler behind the film, and the filler has a front surface which contacts the film between the side wall and the display device.

4. The display apparatus according to claim 1, wherein a portion between the side wall and the display device is filled with a filler behind the film, the filler has a front surface which contacts the film between the side wall and the display device, and the portion of the film disposed beyond the periphery of the display surface is subjected to opaque printing.

5. The display apparatus according to claim 1, wherein the film extends beyond the periphery of the display surface in a plane in which the portion of the film is adhered to the display surface, and the outer edge of the film, which is an edge in the direction of the extension, is mounted to the side wall.

6. The display apparatus according to claim 1, wherein the film has a flat film portion adhered to the display surface, an outer frame portion extending forwardly from the flat film portion and along the outside of the periphery of the display surface at an outwardly curved surface, and the outer edge which is mounted to the side wall at an end of the outer frame portion.

7. The display apparatus according to claim 1, wherein the rear cover is formed of a metallic material having high thermal conductivity, and the back surface of the display device and the back wall of the rear cover are adhered and mounted to each other with a thermally conductive double-faced sheet.

* * * * *